UNITED STATES PATENT OFFICE.

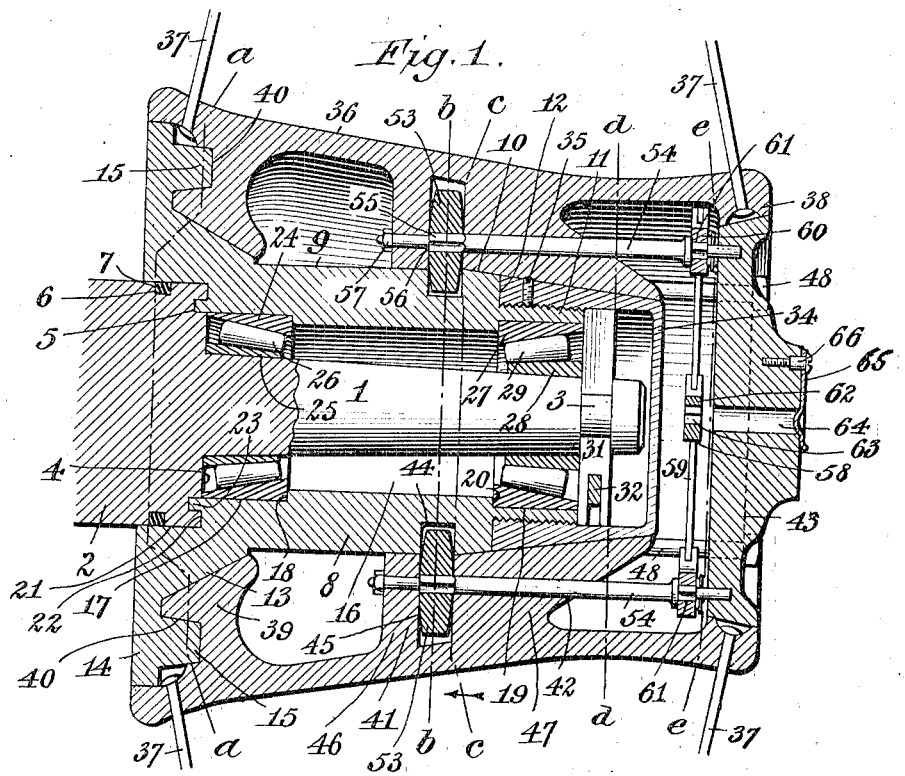

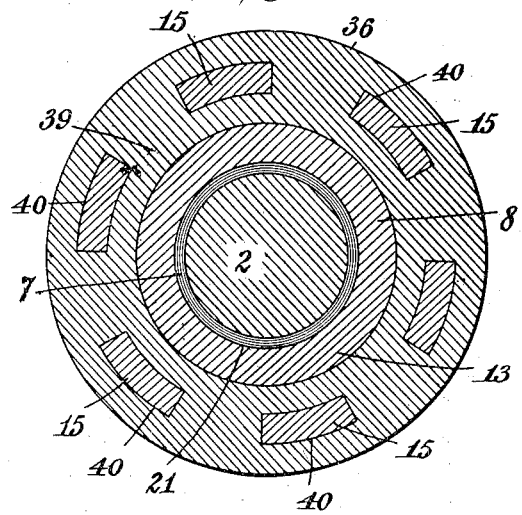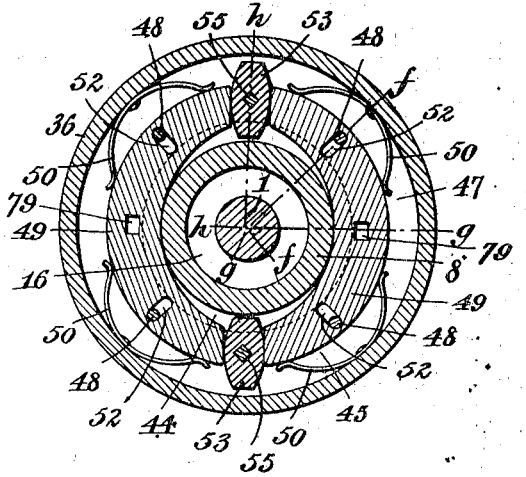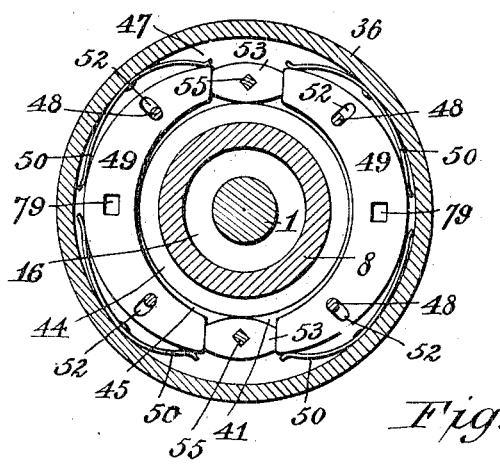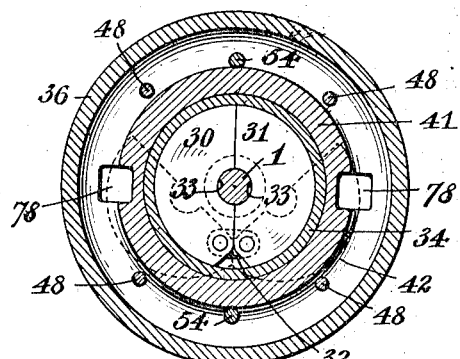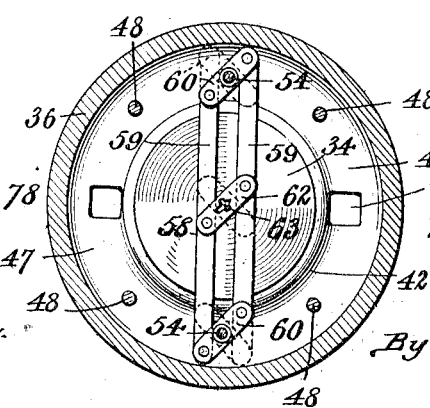

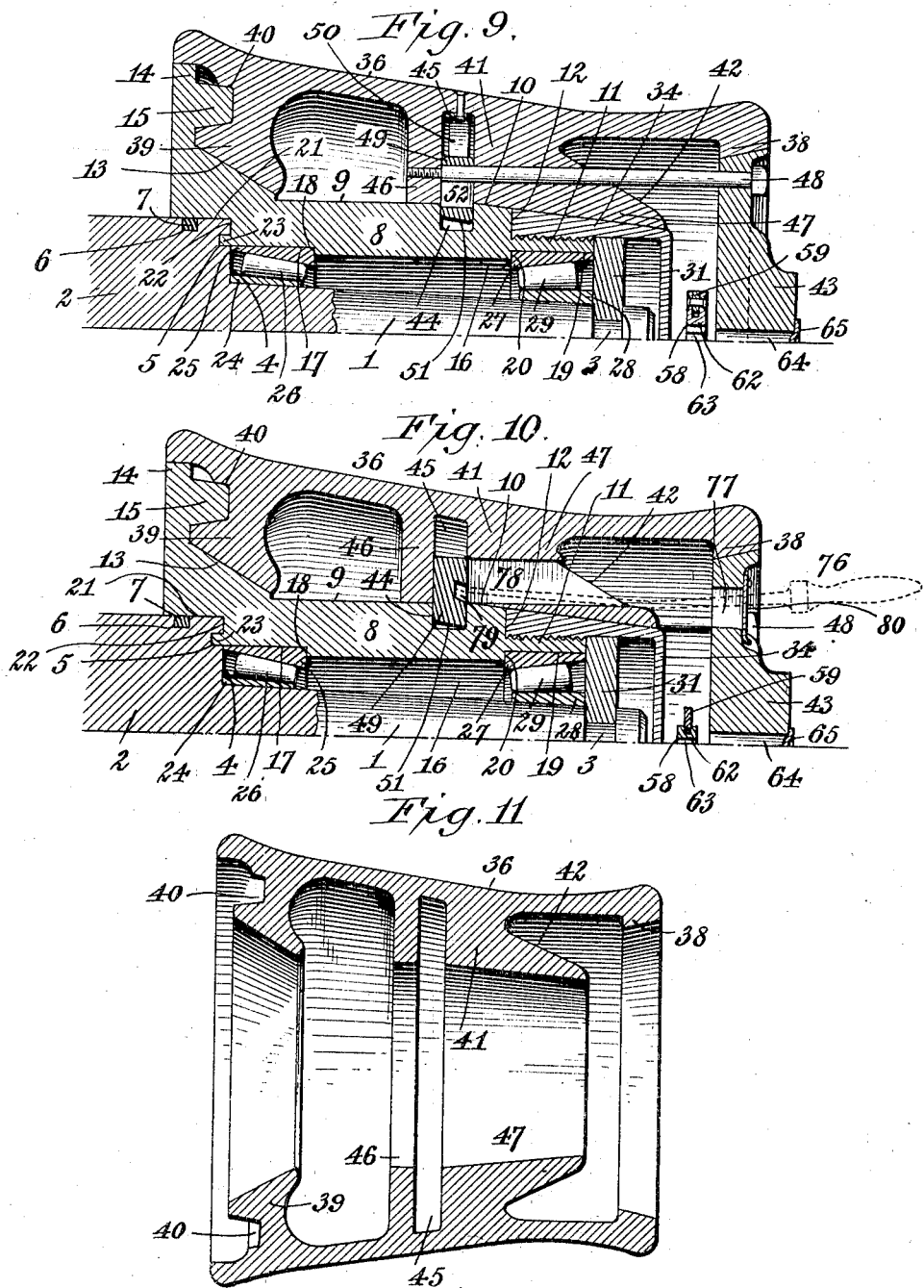

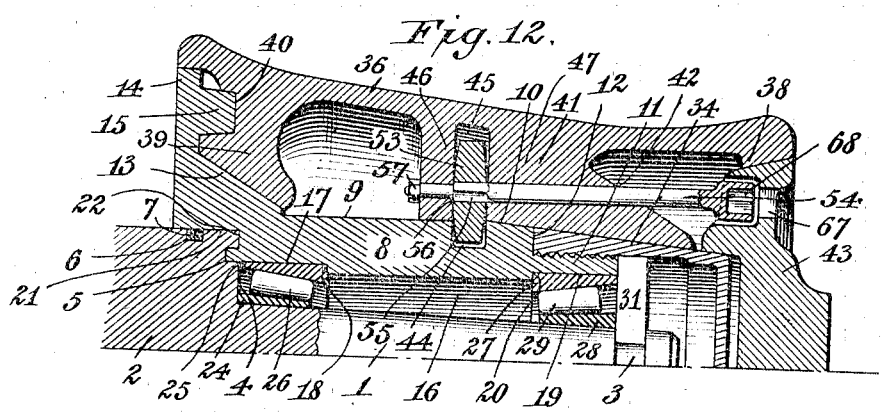
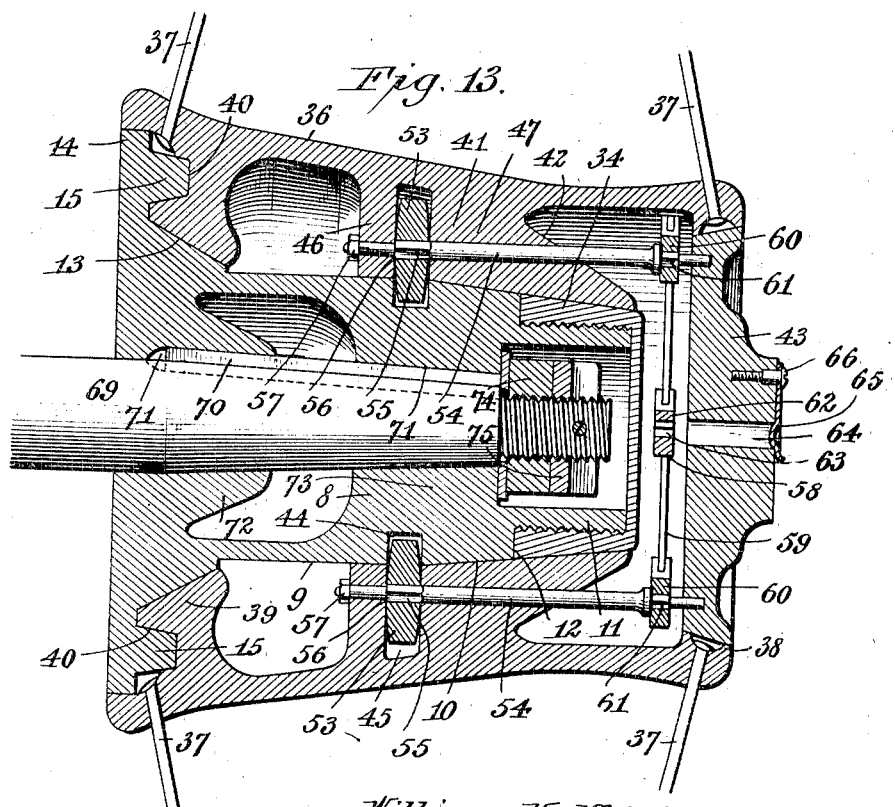

WILLIAM H. McQUIVEY AND GEORGE A. KEATING, OF BUFFALO, NEW YORK.

DEMOUNTABLE WHEEL.

1,312,859.  Specification of Letters Patent.  Patented Aug. 12, 1919.

Application filed May 31, 1917. Serial No. 171,838.

*To all whom it may concern:*

Be it known that we, WILLIAM H. McQUIVEY and GEORGE A. KEATING, citizens of the United States, residing at Buffalo, in the county of Erie and State of New York, have invented certain new and useful Improvements in Demountable Wheels, of which the following is a specification.

Our invention relates to wheels for vehicles, and more particularly to a novel hub forming part of a wire wheel.

Although the invention is particularly designed for use in connection with wire wheels, which are considered advantageous in use when employing pneumatic tires, the hub may nevertheless be employed so as to permit of its use on wooden or artillery wheels.

Wire wheels are intended for quick attachment or detachment to automobiles and are often substituted for a standard form of wooden or artillery wheels supplied with the automobile, and it is, therefore, one of the objects of our invention to provide a hub which can be quickly and conveniently attached to any of the various forms of axles and spindles now employed in automobiles or like vehicles.

Another object of our invention is to provide a hub of simple construction; to form said hub in two parts; and to provide novel means for attaching the parts together, all arranged and constructed so that the parts have the proper bearings to effectively resist the various strains to which vehicle wheels of this type are subjected, the whole permitting the wheels to be readily removed and replaced or others substituted therefor.

With the above and other objects in view, the invention consists in the novel features of construction and in the arrangement and combination of parts to be hereinafter described and particularly pointed out in the subjoined claims.

In the drawings,—

Figure 1 is a central longitudinal section through a hub constructed in accordance with our invention, the hub being of a form for attachment to the spindle of the steering knuckle of an automobile.

Fig. 2 is a detached perspective view of the means for simultaneously actuating the locking devices whereby the outer member of the hub is locked to the inner member.

Fig. 3 is an elevation of the inner member of the hub.

Fig. 4 is a cross section taken on line a—a, Fig. 1, on a reduced scale.

Fig. 5 is a cross section taken on line b—b, Fig. 1, on a reduced scale, the parts being in the positions in which the outer member of the hub is locked to the inner member.

Fig. 6 is a cross section taken on line c—c, Fig. 1, on a reduced scale, the parts being in the positions they assume when the locking devices have been actuated to permit of removing the outer member from the inner member of the hub.

Fig. 7 is a cross section taken on line d—d, Fig. 1, on a reduced scale.

Fig. 8 is a cross section taken on line e—e, Fig. 1, on a reduced scale.

Fig. 9 is a central longitudinal section taken on line f—f, Fig. 5, the same being somewhat enlarged over Fig. 5.

Fig. 10 is a central longtiudinal section taken on line g—g, Fig. 5, the same being somewhat enlarged over said figure.

Fig. 11 is a central longitudinal section through the outer member of the hub.

Fig. 12 is a central longitudinal section taken on line h—h, Fig. 5, the same being somewhat enlarged thereover and having modified means for operating the separators.

Fig. 13 is a central longitudinal section through a hub constructed of a form for attachment to the driving axle of a vehicle.

Reference being had to the drawings in detail, corresponding numerals designate corresponding parts in the several figures.

In Figs. 1 to 12 inclusive, the reference numeral 1 designates the spindle of a steering knuckle 2, said spindle being preferably tapered and having an annular groove 3 near its outer end at the point where the spindle 1 projects from the steering knuckle 2. A wide shoulder 4 is formed which may be said to be the outer end of the steering knuckle, and in this shoulder an annular groove 5 is arranged. On the peripheral portion of the steering knuckle a short distance from the end of the latter, an annular groove 6 is formed in which suitable packing 7 is placed.

8 designates the inner member of the hub, which in general terms may be said to comprise a cylindrical portion 9 slightly tapered at its outer end, as at 10, and having a reduced externally-threaded outer extremity 11 whereby a shoulder 12 is formed near the outer end of said inner member. At the inner end of said inner member it is provided with a flared enlargement 13 having a peripheral flange 14 on the front of which is formed a circular series of outwardly-projecting lugs 15. Said inner member is provided with a central bore 16 enlarged near its inner end, as at 17, to form an inwardly-facing shoulder 18 and at its outer end, as at 19, to form an outwardly-facing shoulder 20. The inner end of this bore is further enlarged, as at 21, to form an inwardly-facing shoulder 22 having an inwardly extending annular rib or flange 23 which enters the annular groove 5 in the flat end face of the steering knuckle 2, said steering knuckle fitting into the enlargement 21 of said inner member with the packing 7 within the groove 6 in contact with the peripheral wall of said enlargement, thus with the flange and groove construction provided at the end of the steering knuckle, guarding against the entrance of dirt or other foreign matter into the interior of said inner member.

Fitting into the enlarged portion 17 of the bore 16 is a bearing comprising the outer raceway 24, the inner raceway 25 and the anti-friction rollers 26, this bearing being confined between the shoulder 18 of the inner member 8 and the outer end of the steering knuckle, thus preventing lengthwise movement of said bearing. In the event of the bearing becoming worn, it would simply be necessary to place a washer between the outer end of the outer raceway and the shoulder 18, or between the inner end of the inner raceway and the outer end of the steering knuckle, thus taking up looseness or play between the raceways and the rollers 26.

A similar bearing is placed within the enlarged portion 19 of the bore and comprises an outer raceway 27, an inner raceway 28, and an annular series of anti-friction rollers 29. The outer raceway is adapted to be of the same length as the enlargement 19 of the bore at the outer end thereof so that the inner end of said raceway bears against the shoulder 20 of said inner member and the outer end thereof is flush with the outer end of said inner member. In the event of the bearing becoming worn, the inner raceway may be forced inwardly and a washer interposed between the outer end thereof and the adjacent locking segments to be presently described.

With the inner member thus placed on the spindle and outer end of the steering knuckle, two locking segments 30, 31 are positioned to enter the annular groove 3 near the outer end of the spindle, these segments forming substantially a complete disk divided diametrically and connected together so that they may be swung one with reference to the other on a link 32 which has opposite ends pivotally attached to opposite segments.

The inner end of each segment is provided with a semi-circular depression 33 adapted to receive the reduced portion of the spindle, formed by said annular groove 3, the inner face of each segment being in contact with the inner wall of said groove and the outer face thereof in contact with the outer wall of said groove. By reason of the link connection between the segments, said segments may be separated, as shown in dotted lines in Fig. 7. This permits of easily placing the segments in position on the spindle and also locks them. They are detached from said spindle when it is desired to remove the inner member from the spindle and steering knuckle.

In order to inclose the projecting end of the spindle and the locking segments 30, 31, and also to prevent separation of said locking segments, an internally-threaded cap 34 is secured onto the reduced externally-threaded outer extremity of said inner member. The outer peripheral surface of this cap is tapered toward the outer closed end thereof to conform to the taper at the outer end of the inner member, and in order to lock this cap against accidental rotation, a set screw 35 is threaded therethrough and bears against the threaded reduced outer end of said inner member. The inner end of said cap is in contact with the shoulder 12 formed by reducing the outer end of said inner member.

With the parts, thus far described, in place, the inner member is securely fastened to the spindle and outer end of the steering knuckle and is free to rotate thereon.

36 designates the outer member of the hub, the external surface of which is so formed that all shoulders or flanges usually found on hubs of wire wheels are entirely eliminated, thus making it easy and convenient to clean the hub on all its exposed surfaces. The outer member of the hub is provided with the usual wire spokes 37 (omitted from Figs. 9 to 12). At the outer end of said outer member an inwardly-directed flange 38 is provided, the inner peripheral face of which is flared toward the outer end of the hub. The inner end of said outer member is provided with a bearing flange or portion 39 whose inner peripheral face is flared toward the inner end of the hub so as to correspond to the flare of the enlargement 13 on the inner member. Said bearing flange or portion rests upon said flared enlargement 13 and provides a substantial bearing for the outer member.

For convenience of description we will hereinafter refer to the inner end of the hub as the rear thereof and to the outer end as the front end. The rear face of the bearing flange or portion 39 is provided with a circular series of recesses or pockets 40 which receive the forwardly or outwardly projecting lugs 15 on the front face of the peripheral flange 14 at the rear end of said inner member, thus securely locking the outer and inner members of the hub together so that said outer member is compelled to rotate with said inner member. At an intermediate point the outer member is provided with an annular inwardly-extending bearing portion 41, the inner peripheral face of which is comparatively long and is adapted to bear against the inner member proper and also against the outer peripheral face of the cap 34, the rear portion of the inner face of said bearing portion 41 being cylindrical and the remainder thereof being tapered forwardly to conform to the tapered front end of said bearing member and the taper of said cap. The outer or front end of said annular inwardly-extending bearing portion 41 is undercut, as at 42, so as to reduce the weight of the same without diminishing the length of the bearing surfaces of said outer member against said inner member. Closing the outer or front end of said outer member is a cap 43, the peripheral face of which is flared rearwardly to conform to the inner peripheral face of the inwardly-directed flange 38 against which it bears. The inner member is provided with an external annular groove 44 a short distance in rear of the shoulder 12 formed thereon, and the annular inwardly-extending bearing portion 41 of the outer member is provided with an internal annular groove 45 which, when the parts of the hub are assembled, registers with the annular groove 44 of said inner member.

The internal groove 45 divides the annular inwardly-extending bearing portion 41 of the outer member into substantially two spaced parts, one a rear part 46 and the other a front part 47.

The cap 43 is secured firmly in place with bolts or securing rods 48; these bolts or rods being inserted from the front end of the hub and passed through the cap, through the front part of said inwardly-extending bearing portion 41 and thence threaded into the rear part of said bearing portion, the rear ends of said bolts or rods being reduced to provide a shoulder which bears against the front face of the rear part of said bearing portion.

Arranged within the annular groove 45 of the bearing portion 41 are oppositely arranged locking segments 49 the outer faces of which are spaced from the inner wall of said groove, and in the space between said segments and wall suitable pressure springs 50 are interposed; these springs serving to force and retain said locking segments in their innermost positions. The inner faces of these locking segments are tapered rearwardly, as at 51, and as best shown in Figs. 9 and 10 each of these locking segments is provided with radial slots 52 through which the bolts or securing rods 48 are passed. These rods therefore serve to prevent displacement of the locking segments when the outer member is removed from the inner member, in addition to locking the cap 43 into position at the outer end of said outer member. When said outer member is positioned on the inner member, the locking segments are forced into the external annular groove 44 of the inner member and prevent disengagement or lengthwise movement of said outer member on said inner member. The inner member is therefore locked against movement lengthwise by said locking segments while independent rotary movement of said outer member is prevented by reason of the lugs 15 of said inner member being entered in the recess or pocket 40 of said outer member. Said locking segments 49 are arranged at opposite sides of the inner member with corresponding ends thereof spaced apart, and between the ends of said locking segments, parts of releasing mechanism are interposed. These parts are designated by the numeral 53 and may be termed "separators," each separator being in the form of an elongated member having opposite side edges curved against which the ends of the locking segment normally bear.

Forming part of said releasing mechanism are two rock shafts or spindles 54 which are mounted for rocking motion in the annular inwardly-extending bearing portion 41 of the outer member. These shafts are provided with square portions 55 near their rear ends which are fitted into square openings in said separators and the portions on the shafts directly in rear of said square portions are reduced in diameter to provide shoulders 56 which are in contact with the front face of the rear part of said bearing portion. The rear extremities of said shaft are further reduced and externally threaded and receive securing nuts 57. In this manner the shafts are fitted into the bearing portions 41 free from binding effects so that they may act freely when operated.

In Figs. 1 and 8 these shafts are shown connected to a manipulating device 58, common to both, and such arrangement is also shown in Fig. 13; while in Fig. 12 provision is made for operating these shafts separately. This manipulating device comprises two parallel diametrically-disposed bars 59; the ends of which are pivotally connected to links 60 which are secured at points midway between their ends to said shafts 54, either by providing square portions on said shafts which enter square openings in said links, as shown at 61, Figs. 1 and 13, or in any other approved manner. These bars are further connected together at points midlength by a link 62 arranged parallel with the links 60, the connection of said link 62 to said bars being pivotal.

The link 62 is provided with a key opening 63 of peculiar shape, said opening being in the axis of the wheel. The cap of the outer member receives the forward ends of said rock shafts and thus prevents deflection of the portions of said shafts which project forwardly from the inwardly-extending bearing portion 41. In this manner said rock shafts are retained in proper alinement so that they have free action, and assurance is also had that the key opening 63 will be retained in axial position. In order to gain access to the key opening of the link 62 by means of a suitable key, an axial opening 64 is formed in the cap 43, and this opening is closed by a dust clip 65 held in position by a pivot screw 66 on which it may be swung to open or close said axial opening. The key which may have a long stem adapted to pass through said axial opening will be formed to fit the shape of the key opening in the link 62. The shapes of the key-openings in the links 62 and the shapes of the openings in the wheels of different cars may be differently formed so that in each instance a special key will be necessary in order to remove the wheels from their axles or spindles.

In Fig. 12 the front ends of the rock shafts 54 are disconnected and enter sockets in the inner face of the cap 43, said cap having openings 67 in line with said shafts, and each shaft being provided with a key socket 68. A suitable key may be inserted through the openings 67 and entered in the key sockets of said shafts to rock or rotate the same the desired distance.

When rotating the shafts 54 the separators secured thereto are adapted to be swung from the positions shown in Fig. 5 to those shown in Fig. 6, thus spreading the locking segments 49 so that their inner edges clear the inner member of the hub, and when the locking segments are in this position the outer member may be moved lengthwise to separate the two members of the hub, the outer member of course carrying the spokes, rim and tire of the wheel with it. The outer member surrounding portion of the wheel may be placed over the inner member when the segments are in the position shown in Fig. 6 and when properly positioned on said inner member, the shafts 54 may be rocked or rotated to move the separators 53 from the positions shown in Fig. 6 to those shown in Fig. 5, during which action the pressure springs 50 force the locking segments inwardly into the external annular groove 44, or, if desired, the shafts 54 may be thus rocked or rotated prior to placing the outer member with the surrounding portion of the wheel onto the inner member, in which case the segments will have assumed their innermost positions with the locking segments positioned as last described, the beveled inner faces thereof will first engage the tapered outer peripheral face of the cap 34 and thence the beveled outer end of the inner member, said locking segments being gradually forced outward until brought in registration with the annular groove 44 of the inner member when they are automatically forced thereinto by the springs 50 so as to securely lock the outer member of the hub to the inner member. With the two tapered portions of the inner member spaced apart and arranged at different angles, the tendency to wear is greatly eliminated.

In Fig. 13 the interior of the inner member 8 is somewhat differently formed than the inner member adapted to be secured to the spindle of a steering knuckle, since it is necessary that the inner member be keyed or otherwise fastened to the shaft. In this figure, 69 represents the driving shaft to which the inner member is secured by means of a key 70, said key entering keyways 71 formed in inwardly-projecting portions of the inner member, and in lieu of the locking segments 30, 31, nuts 74, 75 are threaded onto the externally threaded reduced end of the shaft, one of which may be the usual securing nut and the other a jam nut. In other respects the inner member is like the inner member hereinbefore described and the outer member is made a counterpart of that used in the hub applied to the spindle in a steering knuckle, as shown in Figs. 1 to 12. When for any reason it is found necessary to operate the locking segments 49 independent of the separators 56 this may be accomplished by inserting a suitable tool, such for instance as shown in dotted lines at 76 in Fig. 10, through openings 77 formed in the cap 43 and openings 78 alined with the openings 77 and formed in the front part of the bearing portion 41. For this purpose each of the segments has a depression or pocket 79 in its front face, as clearly shown in Fig. 10. Each of the openings 77 may be closed by a lid 80 pivoted to swing over the openings or away from the same, as required.

Having thus described our invention, what we claim is,—

1. In a demountable wheel, a hub comprising an inner or bearing member having two spaced tapered exterior portions, one of which is arranged at a greater angle than the other, an outer member provided with corresponding tapered portions, means for detachably locking said members together, and means operable from the exterior of said hub to actuate said locking means so as to permit removal of said outer member from said inner member.

2. The combination with a rotatably supported member having a peripheral flange at its rear end, a forwardly tapered portion extending adjacent said flange, a cylindrical portion extending forwardly from said cylindrical portion, and a second forwardly tapered portion at the front end of said cylindrical portion; means for locking said inner member onto a fixed member of a vehicle, and an outer member having a bearing portion fitting onto said first-mentioned tapered portion of said inner member and a second bearing portion fitting onto said second tapered portion and the adjacent cylindrical portion of said inner member, and means to detachably connect said outer member to said inner member so as to cause the two to rotate together.

3. In a demountable wheel, the combination of an inner member adapted to be secured to a spindle or shaft of a vehicle and having at its rear end an outstanding flange provided with spaced forwardly-extending lugs, a forwardly-tapering portion adjacent said flange, a cylindrical portion extending forwardly from said tapering portion, a second tapering portion extending forwardly from said cylindrical portion and a reduced externally-threaded portion extending forwardly from said second-mentioned tapering portion, a cap threaded onto said externally-threaded reduced portion whose exterior is tapered and forms a continuation of the second-mentioned tapering portion of said inner member, an outer member having an internal bearing portion fitting the first-mentioned tapering portion of said inner member and provided with spaced pockets in its rear face to receive the spaced lugs on the outstanding flange of said inner member, said outer member having also a bearing portion between its outer end and said first-mentioned bearing portion and having the interior thereof conforming to the cylindrical portion of said inner member, to the tapered portion of said inner member forward of said cylindrical portion and to the tapered exterior of said cap, and means for detachably locking said members together to prevent relative movement lengthwise.

4. In a demountable wheel hub, the combination of an inner member having an exterior bearing surface, an outer member having interior bearing surfaces conforming to the outer exterior surface of said inner member, said members having registering annular depressions in their bearing surfaces, locking devices arranged in the depression of one of said members and adapted to enter the depression of the other, and spreading means for separating said locking devices to permit separation of said members.

5. In a demountable wheel, the combination of an inner member, an outer member provided with a removable cap at its outer end, and locking mechanism for locking said members together, said locking mechanism being operable through an opening formed in said cap.

6. In a demountable wheel hub, the combination of an inner member having an external annular groove, an outer member having an internal annular groove, a pair of locking segments in the groove of one of said members for locking said members together, and means for simultaneously actuating both locking segments.

7. In a demountable wheel, a hub comprising a pair of members connected together against rotary movement, a pair of devices for locking said members against lengthwise movement relatively, separators between said devices, and means for operating said separators accessible through the front of said outer member.

8. In a demountable wheel, a hub comprising an inner member having an annular external groove, an outer member having an annular internal groove, locking segments in said internal groove, springs for forcing said locking segments into said external groove, separators between the ends of said locking segments, and shafts to which said separators are secured, said shafts extending forwardly from said separators and being accessible through the front of said outer member.

9. In a demountable wheel, a hub comprising an inner member having an annular external groove, an outer member having an annular internal groove, locking segments lying on opposite sides of said inner member within the internal groove of said outer member and being spring-projected into the annular groove of said inner member, rock-shafts journaled in said outer member, and separators within the internal groove of said outer member between the ends of said locking segments, said separators being secured to said rock-shafts and adapted to spread said locking segments to cause them to be withdrawn from the annular groove of said inner member.

10. In a demountable wheel, the combination of an inner and an outer hub member, locking devices for locking said hub members against lengthwise movement relatively, means for actuating said locking devices to permit the outer member to be removed from said inner member, said means including longitudinal shafts and manipulating means connecting said shaft and being operable to cause them to rock or rotate in unison.

11. In a demountable wheel, the combination of a pair of hub members locked together, means for unlocking said hub members one from the other including a device disposed diametrically within the outer member and connecting parts of said unlocking means, said outer member having an opening through its front end to gain access to said diametrically-disposed device.

12. In a demountable wheel, the combination of two hub members, means for locking said hub members together, means for actuating said locking means including a pair of shafts, and a manipulating device common to both shafts including parallel bars and links pivotally connected at opposite ends to the ends of said parallel bars and to each of which one of said shafts is secured, and means whereby said parallel bars are moved relatively to cause said shafts to be rocked or rotated and the locking mechanism to be operated.

13. In a demountable wheel, the combination of a pair of hub members, a pair of locking devices for locking said hub members together at diametrically opposite points, means interposed between said locking devices for actuating the same to unlock one of said hub members from the other including forwardly extending shafts, and an opening in the front of one of said members through which access may be gained to the interior of the hub for actuating said shafts.

14. The combination of an inner hub member and an outer hub member having an axial opening at its front end, locking means for connecting said hub members together, unlocking means including a pair of shafts extending forwardly from the plane of said locking means, a pair of parallel bars, a pair of links pivotally connected at their ends to the ends of said bars and a third link parallel with said pair of links and positioned between the latter, said third link having opposite ends pivotally connected to said bars and being provided with a keyhole in line with the axial opening in the front of said outer member, said shafts being secured to said pair of links.

15. In a demountable wheel, the combination of an outer hub member and an inner hub member, said outer hub member having an annular internal groove and said inner hub member having an annular external groove, a pair of locking segments in said internal grooves provided with radial slots, means for forcing said locking segments into the external groove of said inner member, bolts extending from the front end of said outer member through the radial slots of said locking segments, and means for actuating said locking segments accessible through the front of said outer member.

16. In a demountable wheel, the combination of an outer hub member and an inner hub member, said outer hub member having an internal groove and said inner hub member having an external groove registering with said internal groove, a pair of spring-pressed locking segments in said internal groove at opposite sides of said inner member and adapted to enter the external groove of said inner member, the ends of said locking segments being spaced apart, elongated swinging separators between the ends of said locking segments, said elongated separators being normally in radial position, and means for swinging said separators at a right angle to their normal position.

17. In a demountable wheel, the combination of an inner hub member having a cylindrical portion provided with an annular exteral groove and a tapering external portion extending forwardly from said groove, an outer member provided with an annular internal groove, locking segments in said first-mentioned groove, and springs pressing said locking segments inwardly to cause them to project beyond that portion of the inner surface of said inner member adjacent its internal groove so that when placing said outer member onto said inner member the inner edges of said locking segments are forced into said internal groove while traveling in contact with the tapered portion of said inner member.

18. In a demountable wheel, the combination of an inner member having an annular groove and a tapered external portion extending forwardly from said groove, an outer member having an annular internal groove adapted to register with the external groove of said inner member, a pair of locking segments fitting into the external groove of said outer member and having beveled inner faces, springs within said internal groove forcing said locking segments inwardly, the inner faces of said locking segments being adapted to engage the tapered outer portion of said inner member when placing said outer member onto said inner member, said segments riding in contact with the tapered outer portion of said inner member and being pressed into the internal groove of said outer member until said internal groove is brought in registration with the external groove of said inner member, and means accessible from the exterior of the hub for moving simultaneously said locking segments outwardly to disengage the same from the external groove of said inner member.

In testimony whereof we affix our signatures.

WILLIAM H. McQUIVEY,
GEORGE A. KEATING.